United States Patent
Chrysanthakopoulos et al.

(10) Patent No.: US 11,003,377 B2
(45) Date of Patent: May 11, 2021

(54) TRANSACTIONS IN A DECENTRALIZED CONTROL PLANE OF A COMPUTING SYSTEM

(71) Applicant: VMware, Inc., Palo Alto, CA (US)

(72) Inventors: Georgios Chrysanthakopoulos, Seattle, WA (US); Pieter Noordhuis, Menlo Park, CA (US); Dahlia Malkhi, Palo Alto, CA (US); Nikos Vasilakis, Philadelphia, PA (US); Asaf Kariv, Tel Mond (IL)

(73) Assignee: VMware, Inc., Palo Alto, CA (US)

( * ) Notice: Subject to any disclaimer, the term of this patent is extended or adjusted under 35 U.S.C. 154(b) by 312 days.

(21) Appl. No.: 15/282,025

(22) Filed: Sep. 30, 2016

(65) Prior Publication Data

US 2017/0374161 A1    Dec. 28, 2017

Related U.S. Application Data

(60) Provisional application No. 62/355,541, filed on Jun. 28, 2016.

(51) Int. Cl.
*G06F 3/06*    (2006.01)
*G06F 9/54*    (2006.01)
(Continued)

(52) U.S. Cl.
CPC ............ *G06F 3/0647* (2013.01); *G06F 3/064* (2013.01); *G06F 3/0608* (2013.01); *G06F 3/0652* (2013.01); *G06F 3/0659* (2013.01); *G06F 3/0673* (2013.01); *G06F 8/315* (2013.01); *G06F 9/5027* (2013.01); *G06F 9/541* (2013.01); *G06F 9/542* (2013.01); *G06F 16/2228* (2019.01);
(Continued)

(58) Field of Classification Search
CPC ......... H04L 29/08; H04L 41/20; H04L 67/16; H04L 67/42; H04L 67/32
USPC ........................................................ 709/203
See application file for complete search history.

(56) References Cited

U.S. PATENT DOCUMENTS 5,214,644 A    5/1993    Ikezaki
6,681,306 B1   1/2004    Kessler et al.
(Continued)

OTHER PUBLICATIONS

Diego Kreutz et al., "Towards Secure and Dependable Software-Defined Networks", pp. 1-6, Aug. 16, 2013.
(Continued)

*Primary Examiner* — David R Lazaro
*Assistant Examiner* — Zia Khurshid
(74) *Attorney, Agent, or Firm* — Patterson + Sheridan, LLP

(57) ABSTRACT

A method of managing a transaction in a control plane executing on a computing system that manages a plurality of services includes: receiving, at the control plane from a client, a plurality of first requests for at least one target service of the plurality of services, each of the plurality of first requests including a transaction indicator identifying the transaction; executing at least one handler of the at least one target service to process the plurality of first requests; receiving, at the control plane from the client, a commit request for the transaction coordinator service, the commit request including an instruction to commit the transaction; and executing a handler of the transaction coordinator service to process the commit request and notify the at least one target service of a status of the commit request.

15 Claims, 13 Drawing Sheets

(51) Int. Cl.

| | | |
|---|---|---|
| *G06F 16/23* | (2019.01) | |
| *G06F 16/245* | (2019.01) | |
| *G06F 16/22* | (2019.01) | |
| *G06F 9/50* | (2006.01) | |
| *H04L 29/08* | (2006.01) | |
| *G06F 8/30* | (2018.01) | |
| *H04L 12/24* | (2006.01) | |
| *H04L 29/06* | (2006.01) | |

(52) U.S. Cl.
CPC ............ *G06F 16/23* (2019.01); *G06F 16/245* (2019.01); *H04L 41/0893* (2013.01); *H04L 41/20* (2013.01); *H04L 67/02* (2013.01); *H04L 67/10* (2013.01); *H04L 67/104* (2013.01); *H04L 67/1095* (2013.01); *H04L 67/16* (2013.01); *H04L 67/32* (2013.01); *H04L 67/327* (2013.01); *H04L 67/42* (2013.01); *G06F 2209/5011* (2013.01)

(56) References Cited

U.S. PATENT DOCUMENTS

| | | |
|---|---|---|
| 6,832,239 B1 | 12/2004 | Kraft et al. |
| 6,957,438 B1 | 10/2005 | Travostino et al. |
| 7,096,329 B2 | 8/2006 | Garthwaite |
| 7,299,277 B1 | 11/2007 | Moran et al. |
| 7,313,661 B1 | 12/2007 | Dmitriev |
| 7,325,106 B1 | 1/2008 | Dmitriev et al. |
| 7,340,494 B1 | 3/2008 | Detlefs et al. |
| 7,469,324 B2 | 12/2008 | Tene et al. |
| 7,653,793 B1 | 1/2010 | Garthwaite |
| 8,111,707 B2 | 2/2012 | Riddle et al. |
| 8,185,651 B2 | 5/2012 | Moran et al. |
| 8,607,067 B1 | 12/2013 | Janse van Rensburg et al. |
| 8,694,562 B2 | 4/2014 | Basu et al. |
| 9,167,501 B2 | 10/2015 | Kempf et al. |
| 9,229,754 B2 | 1/2016 | Soundararajan et al. |
| 9,257,092 B2 | 2/2016 | Spracklen et al. |
| 9,792,163 B1 | 10/2017 | Chrysanthakopoulos et al. |
| 9,898,614 B1 | 2/2018 | Muniswamy Reddy et al. |
| 9,910,881 B1 | 3/2018 | Brooker et al. |
| 2004/0044873 A1 | 3/2004 | Wong et al. |
| 2004/0128395 A1 | 7/2004 | Miyazaki |
| 2004/0172507 A1 | 9/2004 | Garthwaite |
| 2005/0166025 A1 | 7/2005 | Wong et al. |
| 2007/0072163 A1* | 3/2007 | Groff .................. G06F 11/1471 434/322 |
| 2009/0248517 A1 | 10/2009 | Tran et al. |
| 2010/0100579 A1 | 4/2010 | Tsai |
| 2011/0082928 A1 | 4/2011 | Hasha et al. |
| 2011/0125873 A1 | 5/2011 | Pacella et al. |
| 2011/0219229 A1 | 9/2011 | Cholas et al. |
| 2011/0251997 A1* | 10/2011 | Wang .................. G06F 11/2097 707/634 |
| 2011/0286470 A1 | 11/2011 | Dec et al. |
| 2012/0151063 A1 | 6/2012 | Yang et al. |
| 2012/0184258 A1 | 7/2012 | Kovvali et al. |
| 2012/0297005 A1* | 11/2012 | Langouev ............... G06F 9/466 709/207 |
| 2013/0007218 A1 | 1/2013 | Shah et al. |
| 2013/0013688 A1 | 1/2013 | Wang et al. |
| 2013/0166709 A1 | 6/2013 | Doane et al. |
| 2013/0250763 A1 | 9/2013 | Assarpour |
| 2014/0112192 A1 | 4/2014 | Chou et al. |
| 2014/0250436 A1* | 9/2014 | Tang .................... H04L 67/101 718/1 |
| 2014/0365622 A1 | 12/2014 | Iyengar et al. |
| 2014/0379823 A1 | 12/2014 | Wilsher et al. |
| 2015/0261670 A1 | 9/2015 | Cheriton |
| 2015/0379100 A1* | 12/2015 | Vermeulen ........ G06F 17/30575 707/620 |
| 2016/0085594 A1 | 3/2016 | Wang et al. |
| 2016/0086260 A1* | 3/2016 | Vermeulen ............. G06Q 40/00 705/35 |
| 2016/0105534 A1 | 4/2016 | Li et al. |
| 2016/0117186 A1 | 4/2016 | Soundararajan et al. |
| 2016/0142769 A1 | 5/2016 | Spracklen et al. |
| 2016/0212179 A1 | 7/2016 | Kern et al. |
| 2016/0285671 A1 | 9/2016 | Rangarajan et al. |
| 2016/0314211 A1 | 10/2016 | Kerai et al. |
| 2017/0371582 A1 | 12/2017 | Chrysanthakopoulos et al. |
| 2017/0371723 A1 | 12/2017 | Chrysanthakopoulos et al. |
| 2017/0371906 A1 | 12/2017 | Chrysanthakopoulos et al. |
| 2017/0373945 A1 | 12/2017 | Chrysanthakopoulos et al. |
| 2017/0374145 A1 | 12/2017 | Chrysanthakopoulos et al. |
| 2017/0374177 A1 | 12/2017 | Chrysanthakopoulos et al. |

OTHER PUBLICATIONS

U.S. Appl. No. 15/195,503 Office Action dated Jan. 26, 2017 consists of 14 pages.
Dugal et al. "Protecting the Router Control Plane" RFC6192, 2011 (Year:2011).
Kreutz et al., "Towards Secure and Dependable Software-Defined Netowrks", 2013 (Year:2013).
Cisco, "Control Plane Protection", 2012 (Year: 2012).
Jones, Operational Security Requirements for Large Internet Service Provider (isp) IP Network Infracstructure:, RFC 3871, 2004 (Year: 2004).
Wikipedia, "Control Plane", 2018 (Year:2018).
Durand et al., "BGP Operations and Security", RFC 7454, 2015 (Year: 2015).

\* cited by examiner

TRANSACTIONS IN A DECENTRALIZED CONTROL PLANE OF A COMPUTING SYSTEM

CROSS-REFERENCE TO RELATED APPLICATIONS

This application claims priority to U.S. Provisional Patent Application Ser. No. 62/355,541, filed Jun. 28, 2016, which is incorporated by reference herein in its entirety.

BACKGROUND

The use of monolithic applications in a computing system, such as a cloud computing system, is gradually being replaced by sets of loosely coupled, independent services. Factoring applications into small services (sometimes referred to as "micro-services") allows those services to have a developmental and operational lifecycle that is independent of their peers. These services typically have a smaller set of responsibilities than their monolithic predecessors, as well as a well-defined application programming interface (API).

The use of such a system of micro-services also comes at a cost: every service may use its own data model, use its own backing store, and define its own interfaces and its own interaction models. As the number of services increases, it becomes difficult to administer the system. For example, different services may use a combination of synchronous and asynchronous APIs, different transports, different serialization formats, their own facilities for authentication and authorization, and so forth. As such, administrators and operators of such systems must possess deep system knowledge to identify runtime issues, and must be informed of the intricacies of every new service added to the system. The proliferation of service technologies also means that users of the system have to use various methods to interact with the system, with varying degrees of observability and extensibility.

SUMMARY

One or more embodiments provide techniques for managing transactions in a decentralized control plane of a computing system. In an embodiment, a method of managing a transaction in a control plane executing on a computing system that manages a plurality of services includes: receiving, at the control plane from a client, a plurality of first requests for at least one target service of the plurality of services, each of the plurality of first requests including a transaction indicator identifying the transaction; executing at least one handler of the at least one target service to process the plurality of first requests; receiving, at the control plane from the client, a commit request for the transaction coordinator service, the commit request including an instruction to commit the transaction; and executing a handler of the transaction coordinator service to process the commit request and notify the at least one target service of a status of the commit request.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Decentralized Control Plane Architecture

Figure 1:
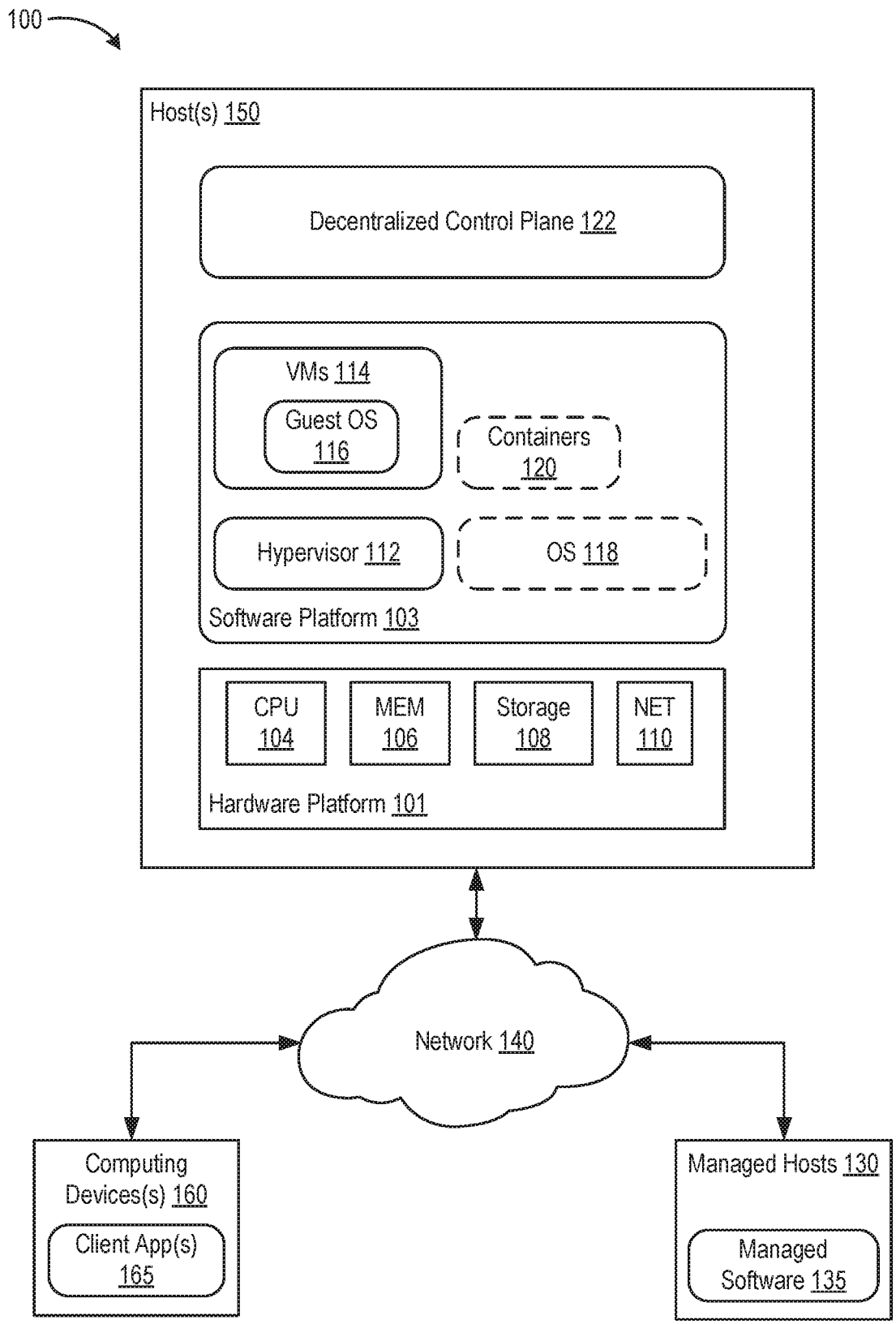
FIG. 1 is a block diagram depicting an embodiment of a computer system supporting execution of decentralized control plane (DCP) software.

FIG. 1 is a block diagram depicting an embodiment of a computer system 100 supporting execution of decentralized control plane (DCP) software (DCP 122). At least a portion of computer system 100 may be part of an on-premise data center controlled and administrated by a particular enterprise or business organization, part of a cloud computing system operated by a cloud computing service provider, or part of a combination of on-premise data center and cloud computing systems. An-premise data center may sometimes be referred to as a "private" cloud; a cloud computing system may be referred to as a "public" cloud; and a combination thereof may be referred to as a "hybrid cloud."

Computer system 100 includes one or more host computers ("host(s) 150"), a network 140, managed hosts 130, and one or more computing devices 160. Network 140 can include various routers, switches, and like network appliances that facilitate communication among hosts 150, between host(s) 150 and computing device(s) 160, and between host(s) 150 and managed hosts 130. Each host 150 is constructed on a hardware platform 101, such as an x86 architecture platform. As shown, hardware platform 101 includes conventional components of a computing device distributed across host(s) 150, such as central processing units ("CPU 104"), system memory ("MEM 106"), storage resources ("storage 108"), and network resources ("NET 110"). CPU 104 is configured to execute instructions, for example, executable instructions that perform one or more operations described herein. Such executable instructions can be stored in MEM 106 and/or in storage 108. MEM 106 includes devices allowing information, such as executable instructions and data, to be stored and retrieved. MEM 110 may include, for example, one or more random access memory (RAM) modules. NET 110 enables host(s) 150 to interface with network 140 and can include network adapters. Storage 108 includes local storage devices (e.g., one or more hard disks, flash memory modules, solid state disks, and optical disks) and/or storage interfaces to network data storage systems (not shown). Example network data storage systems include storage area networks (SANs), a network-attached storage (NAS), and the like. Data "stored" in storage 108 encompasses both data stored in the local storage devices and data stored on network data storage systems accessible through the storage interfaces.

Host(s) 150 include a software platform 103 executing on hardware platform 101. In an embodiment, software platform 103 includes a virtualization layer that abstracts processor, memory, storage, and networking resources of hardware platform 101 into multiple virtual machines ("VMs 114") that run concurrently on the same hosts. VMs 120 run on top of the virtualization layer, referred to herein as a hypervisor 112, which enables sharing of the hardware resources by VMs 114. One example of hypervisor 112 that may be used in an embodiment described herein is a VMware ESXi™ hypervisor provided as part of the VMware vSphere® solution made commercially available from VMware, Inc. of Palo Alto, Calif. Hypervisor 112 may run directly on hardware platform 101 or on top of an operating system. Each of VMs 114 executes a guest operating system ("guest OS 116"). Guest OS 116 can be any commodity operating system known in the art.

In another embodiment, software platform 103 includes an operating system ("OS 118") that runs directly on hardware platform 101. OS 118 can be any commodity operating system known in the art. In another embodiment, software platform 103 includes containers 120 executing within OS 118. Containers 118 implement operating system-level virtualization, wherein an abstraction layer is provided on top of the kernel of OS 118. The abstraction layer supports multiple containers each including an application and its dependencies. Containers 118 do not include a guest OS and are sometimes referred to as "OS-less containers." Each container runs as an isolated process in userspace and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and containers. The term "virtualization software" as used herein is mean to encompass both a hypervisor and an operating system kernel supporting containers. Each host 150 can include any embodiment of software platform 103 described above.

Software platform 103 provides an interface between DCP 122 and hardware platform 101. DCP 122 can execute in a single host 150 or can be distributed across multiple hosts 150. For any host 150, DCP 122 can execute within guest OS 116 of one or more VMs 114, within OS 118, or within one or more containers 120 running on OS 118. DCP 122 includes a programmable framework and runtime software that enable building and running of distributed, highly-available, and scaled-out services 123 (also referred to as "microservices"). Services 123 include an external representational state transfer (REST) interface and can be implemented by a set of distributed nodes. DCP 122 includes a document store for backing service state and the runtime provides replication, synchronization, ordering, and consistency for the service state. One example of DCP that may be configured and used as described herein is Project Xenon™ distributed by VMware, Inc. of Palo Alto, Calif.

In an embodiment, DCP 122 manages hosts ("managed hosts 130") and software installed on such hosts ("managed software 135"). Managed hosts 130 can be configured similarly to host(s) 150. Managed software 135 can include hypervisors, VMs, guest OS, containers, OS, and the like (similar to software platform 103), as well as applications. DCP 122 can be used to build an IaaS fabric within managed hosts 130. Services 123 can be used for configuration (desired state), workflows (e.g., finite state machine tasks), grooming, scheduling logic, and the like. IaaS implementation is just one example use of DCP 122. In general, DCP 122 includes services that can be used to manage various aspects of managed hosts 130 and managed software 135.

Computing devices 160 can execute client applications 165 to interact with DCP 122. Computing devices 160 can include computers, laptops, tablets, mobile devices, or the like. Client applications 165 can communicate with services of DCP 122 using their REST interfaces. Client applications 165 can start, pause, resume, and stop services of DCP 122 using REST application programming interface (API) commands, as described further below.

Figure 2:
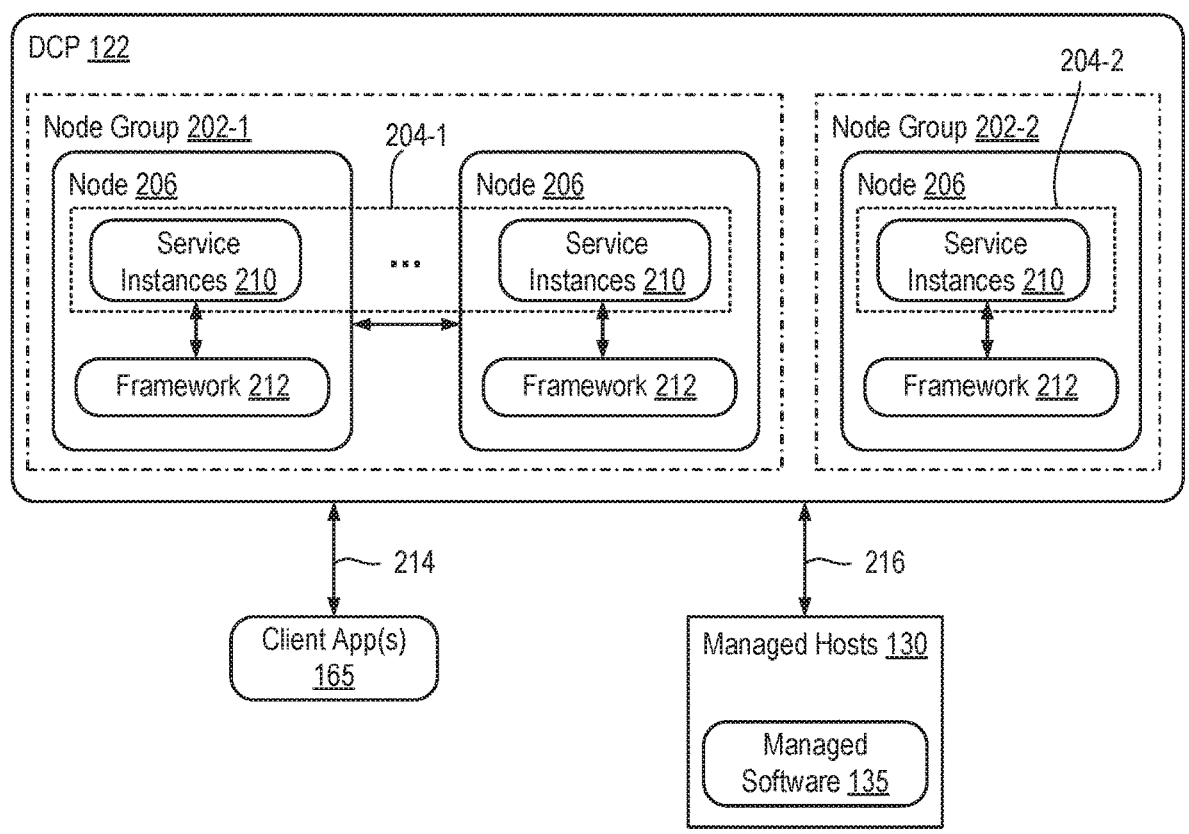
FIG. 2 is a block diagram depicting a DCP according to an embodiment.

FIG. 2 is a block diagram depicting DCP 122 according to an embodiment. DCP 122 includes one or more nodes 206. A "node" is a process, which can execute in various contexts, such as an OS of a host computer, guest OS of a VM, container in an OS, etc. In general, nodes 206 host one or more services 204. Thus, a node is an instance of a "service host process." A node can execute directly on an OS kernel (e.g., compiled C, C++, etc. processes) or within a runtime environment (e.g., Java®, Go™, etc. processes). In various examples described herein, each node 206 is a Java® process with Java® objects, but those skilled in the art will appreciate that the examples can be ported to other programming languages and platforms. Each node 206 is accessed using an Internet Protocol (IP) address and transmission control protocol (TCP) port. A given host environment (e.g., OS, guest OS, container, etc.) can host one or more nodes. In cases where a host environment hosts multiple nodes, each node can be assigned a different IP address and/or TCP port. For example, a service of DCP 122 named Examples can be accessed on a node localhost through port 8000 using a uniform resource indicator (URI) http://localhost:8000/core/examples.

A "service" is a logical object in DCP 122 having a unique URI. An example URI of a service is /core/examples/example1. A service is managed externally through a REST API. Each node 206 hosts one or more service instances 210. A "service instance" is an object within a node that handles requests targeting a service 123 of DCP 122 (referred to as a "service object"). On a given node 206, the URI of a service 123 maps to a service instance 210. For example, if a node 206 is a Java® process, a service instance 210 can be a Java® object instantiated in the Java® process. A "request" is a message including verb mapped to an action of the REST API. In an embodiment, the REST API supports actions mapped to hypertext transfer protocol (HTTP) verbs, such as POST, DELETE, PATCH, PUT, and GET. A "response" is a message including status and potentially results of a request.

A service 123 of DCP 122 is implemented by one or more service instances 210 within one or more nodes. Nodes 206 can be organized in node groups, e.g., node group 202-1 and node group 202-2 (generally node groups 202). Each node group 202 includes one or more nodes 206. In the example, node group 202-1 includes a plurality of nodes 206, whereas node group 202-2 includes a single node 206. Services 123 can be instantiated across a plurality of nodes (i.e., a given service 123 can be implemented using a plurality of service instances 210 across a plurality of nodes 206). In such case, services instances 210 include the same URI at their respective nodes (e.g., /core/examples/example1) and implement a single service 123. Multiple service instances 210 can be implemented on a single node, in which case each service instance includes a unique URI and represents a unique service (e.g., /core/examples/example1 and /core/examples/example2). Unique services can be of the same service type (e.g., /core/examples/example1 and /core/examples/example2 can have an example service type). In the example, services 123A are distributed across nodes 206 in node group 202-1, and services 123B are implemented by node 206 in node group 202-2.

Each node 206 provides a framework 212. Framework 212 provides runtime support for service instances 210. Framework 212 provides a plurality of functionalities, such as replication, synchronization, ordering, and consistency of service state. Framework 212 also maintains a document store for persistent storage of states associated with services 123 that are configured as durable. Framework 212 is described further below with respect to FIG. 3.

Client applications 165 interact with services 123 of DCP 122 using an asynchronous request/response protocol 214. In an embodiment, request/response protocol 214 is HTTP. Services 123 can interact with each other using request/response protocol 214. Services 123 can also interact with themselves using request/response protocol 214 (e.g., a service 123 can update its state using a PATCH verb). Services 123 interact with managed hosts 130 and managed software 135 using interface 216, which can operate using any type of protocol (e.g., remote procedure protocol (RPC), HTTP, etc.) that can be used to communicate with and control managed hosts 130 and managed software 135.

Figure 3:
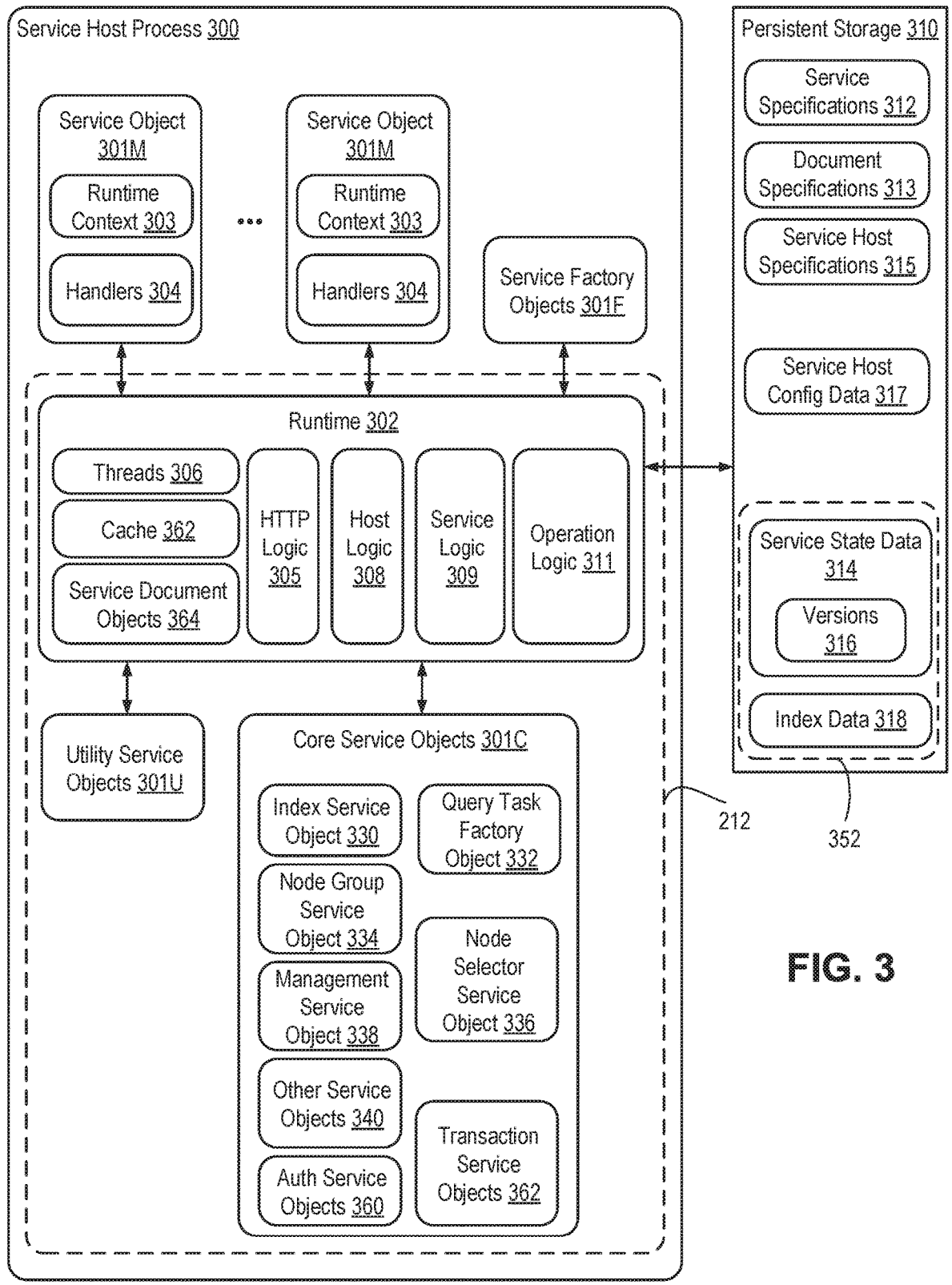
FIG. 3 is a block diagram depicting a service host process of a DCP according to an embodiment.

FIG. 3 is a block diagram depicting a service host process 300 of DCP 122 according to an embodiment. Service host process 300 can be a node 206 of DCP 122 as described above. In the example, service host process 300 includes a plurality of service objects 301M, which are service instances of one or more user-created services. Service host process 300 also includes user-created service factory objects 301F, which can be used to create service objects 301M on request. Service objects 301M and service factory objects 301F are objects created and managed by framework 212.

Framework 212 includes runtime software (referred to as "runtime 302"), utility service objects 301U, and core service objects 301C. Runtime 302 is the code of the service host process executed by CPU 104. Runtime 302 includes HTTP logic 305, host logic 308, service logic 309, and operation logic 311. Runtime 302 also manages a pool of threads 306 within service host process 300. Core service objects 301C are service instances of various framework-supplied services, such as an index service, a query task service, a node group service, a node selector service, a management service, access control services, and various other services. In the embodiment shown, core service objects 301C include an index service object 330, a query task service factory object 332, a node group service object 334, a node selector service object 336, a management service object 338, access control service objects 360, and various other service objects 340, each of which is a service instance for a respective core service. Runtime 302 accesses persistent storage 310, which stores a document store 352, service specifications 312, document specifications 313, service host specifications 315, and service host configuration data 317. Persistent storage 310 is implemented by storage 108. Document store 352 includes a service state data 314 and an index data 318. Service state data 314 can include one or more versions 316 of service states for the services of the control plane.

Services each have a set of capabilities, defined by a plurality of service options. A user can declare the service options for services in service specifications 312. Example service options include PERSISTENCE, REPLICATION, OWNER SELECTION, and INSTRUMENTATION. The PERSISTENCE service option indicates to runtime 302 that the respective service is durable and should have its state saved in document store 352 (i.e., persistent storage). The REPLICATION service option indicates to runtime 302 that the respective service requires state updates to be replicated among a plurality of nodes. The INSTRUMENTATION service option indicates to runtime 302 that the respective service requires tracking of various statistics. The OWNER SELECTION service option indicates to runtime 302 that the respective service requires consensus and leader election to be used in the replication protocol. Runtime 302 can be responsive to various other service options.

In general, a user specifies a plurality of service options for services in service specifications 312. In this manner, service specifications 312 define the capabilities of respective services. In an embodiment, classes (e.g., Java® classes) define a service type and service specifications 312 include class definitions for various service types. A portion of an example class definition for a service type in the Java® programming language is shown below:

```
public class ExampleService extends StatefulService {
    public ExampleService( ) {
        super.toggleOption(ServiceOption.PERSISTANCE, true);
        super.toggleOption(ServiceOption.REPLICATION, true);
        super.toggleOption(ServiceOption.INSTRUMENTATION,
            true);
        super.toggleOption(ServiceOption.OWNER_SELECTION,
            true);
    }
    ...
}
```

In the example, a service type named "ExampleService" is declared that extends a base class "StatefulService." The functions of the StatefulService class can be implemented by service logic 309, which is described further below. ExampleService includes a public constructor "ExampleService( )" that makes several calls to a function "toggleOption" of the StatefulService base class for setting service options. The service options are declared as part of an enumeration "ServiceOption." An instance of a service of type ExampleService is a service object generated by creating an instance of the ExampleService class. The above example illustrates one example technique for declaring service options for a service. Other techniques can be employed using the Java® language or other programming languages.

Document specifications 313 specify the specific structure of documents that represent states of services ("service documents"). The terms "service state" and "service document" are used interchangeably herein. A "service document instance" is an object within service host process 300 that stores a service document (referred to as a "service document object" or "service state object"). A service document object is a plain old data object (PODO) (no methods) that includes various fields. A version of the service state for a service is determined by the values of the fields of the service document object. In an embodiment, classes (e.g., Java® classes) define a type of service document and document specifications 312 include class definitions for service document types.

Figure 6:
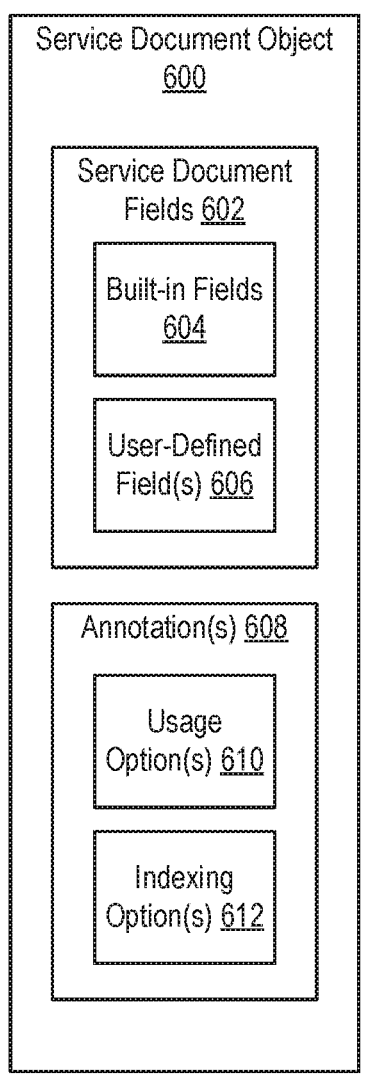
FIG. 6 is a block diagram depicting structure of a service document object according to an embodiment.

FIG. 6 is a block diagram depicting structure of a service document object 600 according to an embodiment. Service document object 600 includes service document fields 602 and optionally one or more annotations 608 to the service document fields 602. Service document fields 602 (also referred to as service document object fields) store values that form the service state. Service document fields 602 can include various data types, such as integers, strings, bytes, collections, maps, Booleans, floating point numbers, dates, URIs, enumerations, tuples, PODOs, and the like. A value stored by each service document field 602 can be a single value (e.g., an integer value, string value, etc.) or multiple values (e.g., a collection of values, map of key/value pairs, etc.). A service document field 602 can include one or more annotations 608. Annotations 608 provide meta-data for one or more service document fields 602.

In an embodiment, annotations 608 include usage options(s) 610 and indexing option(s) 612. Usage option(s) 610 can include one or more annotations related to how a service document field is used, such as single-assignment (i.e., indicates the field is immutable), optional (indicates that the field may or may not have a value), service-use (indicates that the field is only for use by the service and not visible to the client), infrastructure-use (indicates that the field is only for use by the runtime and not visible to the service instances or clients), link (indicates that the field is a link to another document), and the like. Indexing option(s) 612 include one or more annotations related to how a service document field should be processed when the service document is parsed for indexing and storage. Indexing option(s) 612 can include expand (indicates that a multi-value field, such as a PODOs, should have all its fields indexed and stored), store-only (indicates that the field should not be indexed, but only stored), text (indicates that the field should be indexed and stored as text), sort (indicates that the field should be indexed in a manner that enables sorting), and the like.

Service document fields 602 can include built-in fields 604 and user-defined field(s) 606. Built-in fields 604 are used by framework 212 (e.g., part of a ServiceDocument base class). Built-in fields include various fields, such as a document kind field, a self-link field (e.g., to hold a URI of the corresponding service), an authorized principal link field (e.g., to hold a URI of a user who owns the document), a document description field, document update time field, document version field, document epoch field, and the like. User-defined field(s) 606 include one or more fields defined by a user for storing service state of a user-defined service.

Returning to FIG. 3, an example class definition of a document type implemented in Java® is shown below:

```
public class ExampleService extends StatefulService {
    public static class ExampleServiceState extends
                ServiceDocument {
        public static final String FIELD_NAME_KEY_VALUES =
            "keyValues";
        public Map<String, String> keyValues = new
            HashMap<>( );
        public Long counter;
        @UsageOption(option =
            PropertyUsageOption.AUTO_MERGE_IF_NOT_NULL)
        Public String name;
    }
    ...
}
```

In the example, the ExampleService class includes a nested class "ExampleServiceState" that extends a "ServiceDocument" base class. The ExampleServiceState class includes fields "keyValues," "counter," and "name." The keyValues field is a multi-valued field having a Map<string, string> type, the counter field is a single-valued field having an integer type, and the name field is a single-valued field having a string type. The name field includes a usage option annotation AUTO_MERGE_IF_NOT_NULL, which indicates that the field is updated if its value is not null during an update operation. The above example illustrates one example technique for declaring structure of a service document. Other techniques can be employed using the Java® language or other programming languages.

Runtime 302 creates service document objects 364 to store service states for use by handlers 304 of service instances 210. Each handler 304 comprises a software function configured to process a particular type of request. Each service document object 364 stores a version of service state. Service document objects 364 are stored in memory 106 of host computer 150 (e.g., in-memory service state). Service document objects 364 can be created and destroyed as handers 304 and other functions are invoked and completed. In some embodiments, runtime 302 can maintain a cache 362 for temporarily storing service document objects 364 longer than a single function or handler 304 call. Cache 362 is stored in memory 106 of host computer 150. For a durable service, its service document is stored persistently in document store 352. For a non-durable service, its service document is only stored for as long as a respective service document object is stored in memory (e.g., held in cache 362). In an embodiment, document store 352 is log-append structured storage. To save a service document, framework 212 appends the service document to service state data 314 in document store 352. If a service document is saved multiple times, then document store 352 will include multiple versions 316 of the service document. When a service document is saved, framework 212 can index at least a portion of the service document by adding to index data 318.

Each service factory object 301F is an instance of a service factory. A "service factory" is a service used to create child services. Each service factory object 301F is used to create child service objects (e.g., service objects 301M) during runtime. In an embodiment, service factory objects 301F are singletons (e.g., only one service factory object per service factory in a given service host process) and are not durable. Each service factory object 301F can include handlers for POST and GET verbs of the REST API. The handler for the POST verb creates a service object. The handler for the GET verb provides a list of created service objects and their state. An example class definition and instantiation of a service factory for a service implemented in Java® is shown below:

```
public class ExampleService extends StatefulService {
    public static FactoryService createFactory( ) {
        return FactoryService.createIdempotent
            (ExampleService.class,
             ExampleServiceState.class);
    }
    ...
}
public class DecentralizedControlPlaneHost extends ServiceHost {
    public ServiceHost start( ) {
        // Start the example service factory
        super.startFactory(ExampleService.class,
                ExampleService::createFactory) ;
        ...
        ...
    }
    ...
}
```

In the example, the ExampleService class includes a class function "createFactory( )" that is used to create an instance of FactoryService. The createFactory( ) function calls a class function "createIdempotent" of a base class "FactoryService" to create the service object. A singleton instance of FactoryService is started on host start with a "start( )" function of "DecentralizedControlPlaneHost" that extends a "ServiceHost" base class. The functions of the ServiceHost base class can be implemented by host logic 308, which is described further below.

Host logic 308 is configured to manage service lifecycle and handle delivery of operations to services (remote and local). Host logic 308 maintains a runtime context that includes various information, such as IP address, TCP port number, node ID, and the like. At least a portion of the runtime context of host logic 308 can be saved in service host configuration data 317. Host logic 308 includes various methods for initialization of runtime 302, as well as starting, stopping, pausing, resuming, etc. of core services, service factories, utility services, and user-created services. Host logic 308 can also include methods for applying authorization policies, loading service state from and saving service state to document store 352, caching service state, queuing and forwarding requests to service objects, and performing maintenance on services. Host logic 308 also schedules service handlers to use threads 306 when the service handlers are invoked. As described in the example above, a user can extend host logic 308 to include various customizations (e.g., custom start methods).

Service logic 309 is configured to implement base functionality for services. For example, service logic 309 can implement the functions of the StatefulService base class described in the examples above. Service logic 309 includes functions for queueing requests, checking service state, handling requests, loading and linking service state, validating updates to service state, handling REST API verbs, handling request completions, handling replication, and handling synchronization. For some functions, service logic 309 can cooperate with functions of host logic 308.

Operation logic 311 is configured to implement functionality for encapsulating the request/response pattern of client to service and service-to-service asynchronous communication. Operation logic 311 includes functions for creating operation objects and associating the operation objects with a response/request message, and associating the operation objects with service state objects. Operation logic 311 also includes functions for indicating whether an operation object is from replication, synchronization, or notification, and whether the operation object includes proposed state or committed state.

Figure 7:
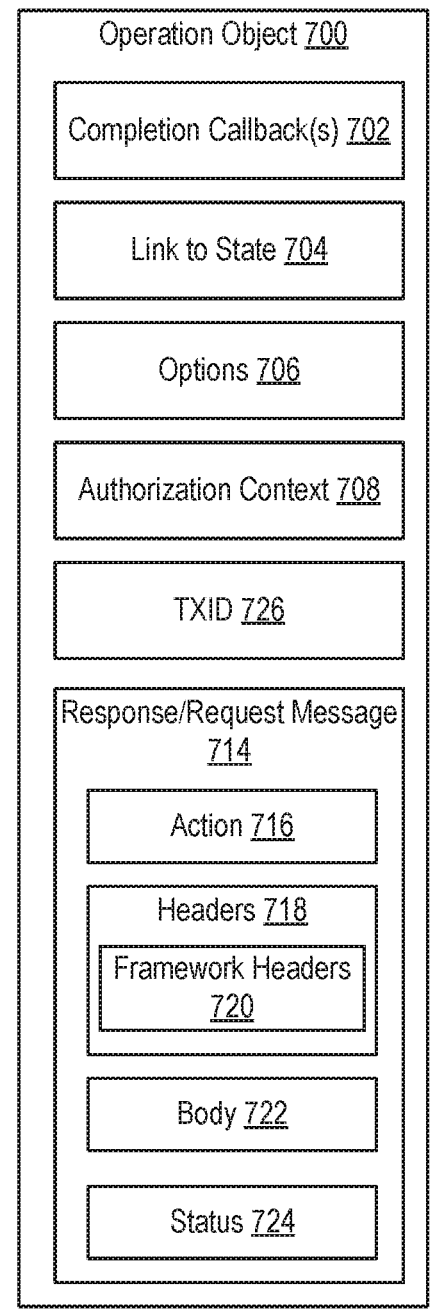
FIG. 7 is a block diagram depicting an operation object according to an embodiment.

FIG. 7 is a block diagram depicting an operation object 700 according to an embodiment. Operation object 700 includes one or more completion callbacks 702, a link to state 704, options 706, an authorization context 708, and response/request message 714. Completion callback(s) 702 points to procedure(s) to be called in response to completion of operation 700. Link to state 704 is a reference to a service document object in memory. Options 706 can include various options, such as a replication option to indicate that the operation object is part of the replication protocol, a forwarding option to indicate that the operation object has been forwarded from another node, a notification option to indicate that the operation object is part of the notification protocol, and the like. Authorization context 708 includes information that can be used to authorize a request. Response/request message 714 can include an action 716, headers 718, a body 722, and status 724 depending on the type of message. Action 716 indicates an HTTP verb. Headers 718 can include various HTTP headers. In addition, headers 718 can include framework headers 720. Framework headers 720 include proprietary headers used by framework 212. Body 722 includes the body of a request or response message. Status 724 includes a status code for a response message. For actions that perform updates to service state (e.g., PUT or PATCH), body 722 includes the update data.

Returning to FIG. 3, each service object 301M includes a runtime context 303 and handers 304. Runtime context 304 can store various information for service object 301M, such as a current processing stage of the service object (e.g., created, available, stopped, etc.), the current version of service state, the current epoch for replication, and the like. Runtime context 304 is the portion of a service object 301M that is stored in memory. Handlers 304 can include functions invoked by runtime 302 when services are created, started, paused, resumed, and stopped. Handlers 304 can include functions invoked by runtime 302 for verbs of the REST API (e.g., GET, PUT, PATCH, DELETE, POST). Handlers 304 can extend or replace functionality of service logic 309. Handlers 304 can supply required functionality not present in service logic 309 (e.g., PUT and PATCH handlers). A user can specify handlers 304 as part of service specifications 312 (e.g., methods in a class definition). When a handler 304 is invoked, host logic 308 allocates a thread 306 to the handler.

An example definition of a PUT handler for a service implemented in Java® is shown below:

```
public class ExampleService extends StatefulService {
    public void handlePut(Operation put) {
        ExampleServiceState newState = getBody(put);
        ExampleServiceState currentState = super.getState(put);
        // example of structural validation
            If (currentState.name != null && newState.name == null) {
                put.fail(new IllegalArgumentException("name must be
                    set"));
                return;
            }
        updateCounter(newState, currentState, false);
        // replace current state with the body of the request
        super.setState(put, newState);
        put.complete( );
    }
    ...
}
```

In the example, the class ExampleService includes a handler "handlePut( )" for handling PUT requests. The handlePut( ) function receives an "Operation" parameter put that references an operation object encapsulating the request. The handlePut( ) function first gets newState from the body of the request using a function getBody( ) and currentState of the service using a function getState( ) of the superclass. The handlePut( ) function then validates newState and calls the fail( ) method of put if invalid. The handlePut( ) function then calls a private function updateCounter( ) to update the counter field of the service state. The handlePut( ) function then replaces the current state with the state in the body of the request using the function setState( ) of the superclass. Finally, the handlePut( ) function invokes the complete( ) function of put. Other techniques can be employed using the Java® language or other programming languages for implementing a handler.

Clients access framework 212 and services using the REST API. HTTP logic 305 manages REST API transactions with clients. In an embodiment, the REST API includes HTTP actions POST, DELETE, PATCH, PUT, and GET. Sending POST to a service factory creates an instance of a service (i.e., a service object 301M). Sending POST to a service can be used to compute work or add new resources on a service. Sending DELETE to a service stops the service and creates a new empty state. Sending PATCH to a service can be used to update at least a portion of service state. Sending PUT to a service can be used to replace service state in its entirety. Sending GET to a service can be used to retrieve the state of the service. Sending GET to a service can lead to several asynchronous operations to other services to collect their states, which the service then composes on the fly and returns as its state.

In an embodiment, runtime 302 (e.g., host logic 308) starts one or more utility service objects 301U for each service object. Utility service objects 301U are instances of various utility services, such as a subscription service, statistic service, user interface (UI) service, configuration service, template service, and availability service. The subscription service can be used to provide a list of subscribers to a service. A service notifies its subscribers in response to state changes. The statistics service can be used to report various runtime statistics associated with services. The UI service can be used to render a UI on a client for accessing a service. The configuration service can be used to change service options or other configuration data during runtime. The template service can be used to provide a default state for a service. The availability service can be used to determine if a service is ready to accept requests. These are just some examples of utility services that can be instantiated by runtime 302 per service. In an embodiment, the utility services (e.g., subscription, statistics, UI, configuration, template utility services) can be implemented on service host process 300 using a single utility object 301U.

Runtime 302 (e.g., host logic 308) also creates core service objects 301C. Core service objects 301C are instances of various core services. The index service manages document store 352. Index service object 330 handles requests on behalf of runtime 302 and service objects 301M for storing and retrieving service documents at service host process 200. Index service object 330 also manages versioning and indexing of service documents at service host process 200.

Query task factory service creates query task services upon request. Remote clients or local clients (e.g., service objects 301M) can send requests to query task factory service, which are handled on service host process 300 by query task factory service object 332, to create query task services. Query task services cooperate with the index service to perform various queries to obtain service state information.

Node group service tracks node membership across node groups. Node group service employs a scalable gossip layer to manage node group membership. In an embodiment, node selector service selects owner nodes within a given node group using a consistent hashing algorithm. Runtime 302 can use node group service object 334 to forward requests to owner nodes for services that implement replication with consensus as described herein. Runtime 302 can use node selector service object to determine owner nodes. Management service provides a REST front end for changing various configuration data, such as TCP port, maintenance intervals, etc. Access control services control user access to services. When authentication and authorization are enabled, all requests to a service are subject to two additional checks: (1) Is the request on behalf of a valid user? (2) Is that user authorized to perform the desired action of the service? Any unauthorized access will result in a "forbidden" response from framework 212. Core service objects 301C can include various other service objects 340, such as instances of DNS services, log services, JavaScript services, and the like.

Framework 212 is configured to support clustering, that is, the ability to group together a set of nodes for the purposes of scale-out, high-availability, and unified management. Framework 212 manages node group membership (e.g., using node group service), balancing and forwarding of requests, replication, and synchronization. As discussed above in FIG. 2, a node group includes a plurality of nodes. A given node can belong to multiple node groups. A service belongs to a single node group. Node group service manages group membership using a gossip protocol. In general, a new node joins the node group through an existing member. Each node in the node group sends its view of membership to peer nodes in the node group during maintenance intervals (e.g., using a PATCH request handled by node group service object 334). Nodes can update their view of membership based the membership views received from peers.

Framework 212 implements balancing and forwarding of requests (e.g., using host logic 308 and node selector service). A request can enter through any node in the node group. If a service includes an owner (e.g., configured using the OWNER SELECTION service option), framework 212 forwards requests targeting the service to its owner node. Node selector service employs a consistent hashing algorithm to designate an owner node for a given service per request. As a result, ownership per service is fixed as long as node group membership is stable. As nodes are added and removed from the node group, ownership per service can change. Framework 212 increments a replication epoch for a service in response to ownership changes. The consistent hashing algorithm ensures that ownership across services is evenly spread across group members.

Framework 212 implements replication across nodes in a node group (e.g., using service logic 309, host logic 208, and node selector service 336). Service state can be updated by a service instance at an owner node. In response, the owner node increments state version and replicates the updated state to peer nodes in the node group. Framework 212 can be configured to replicate updated state to all group members or only a portion of the group. If replication fails, then the request that triggered the state update fails and synchronization is triggered. If replication is successful, the updated state is persisted at the owner node. Framework 212 employs a consensus algorithm to determine whether replication is successful.

Framework 212 implements synchronization (e.g., using service logic 309 and host logic 308). Synchronization can be triggered on demand, periodically, or in response to replication failure. During synchronization, framework 212 selects an owner for a service. The owner node broadcasts a request to its peer nodes to obtain their latest state for the service. Framework 212 on the owner node chooses the best state based on replication epoch and version. The owner node then sends the selected best state for the service to the peer nodes in the node group.

In the embodiment of FIG. 3, each of runtime 302, core service objects 301C, and utility service instances 301U are described has performing specific functionalities of framework 212. Although specific examples are described where a given component performs a given function, any functionality of framework 212 described herein can be performed by runtime 302, core service objects 301C, utility service objects 301U, or a combination thereof. Moreover, although runtime 302 is described as having a specific component structure, the functionalities of runtime 302 can be performed by any of one or more logic components, including HTTP logic 305, host logic 308, service logic 309, and operation logic 311, or any other component.

In various embodiments, a component in framework 212 is described as "obtaining state" of a particular service. Service state can be obtained using various techniques, each of which ultimately results in either the state being obtained from cache 362 or service state data 314 in document store 352. In an embodiment, a client or service can obtain state by sending a request with the GET verb to the service. In such case, the service takes care of obtaining state from cache 362 or using the index service. Alternatively, a client or service can directly send a request with the POST verb to the index service to obtain service state.

In various embodiments, a component in framework 212 is described as "forwarding a request" to a target service or "sending a request" to a target service. To perform some work for a request, a client or service can send the request with the POST verb to the target service. To get service state, a client or service can send the request with the GET verb as described above. To modify service state, a client or service can send the request with the PATCH verb. To replace service state, a client or service can send the request with a PUT verb.

Figure 4:
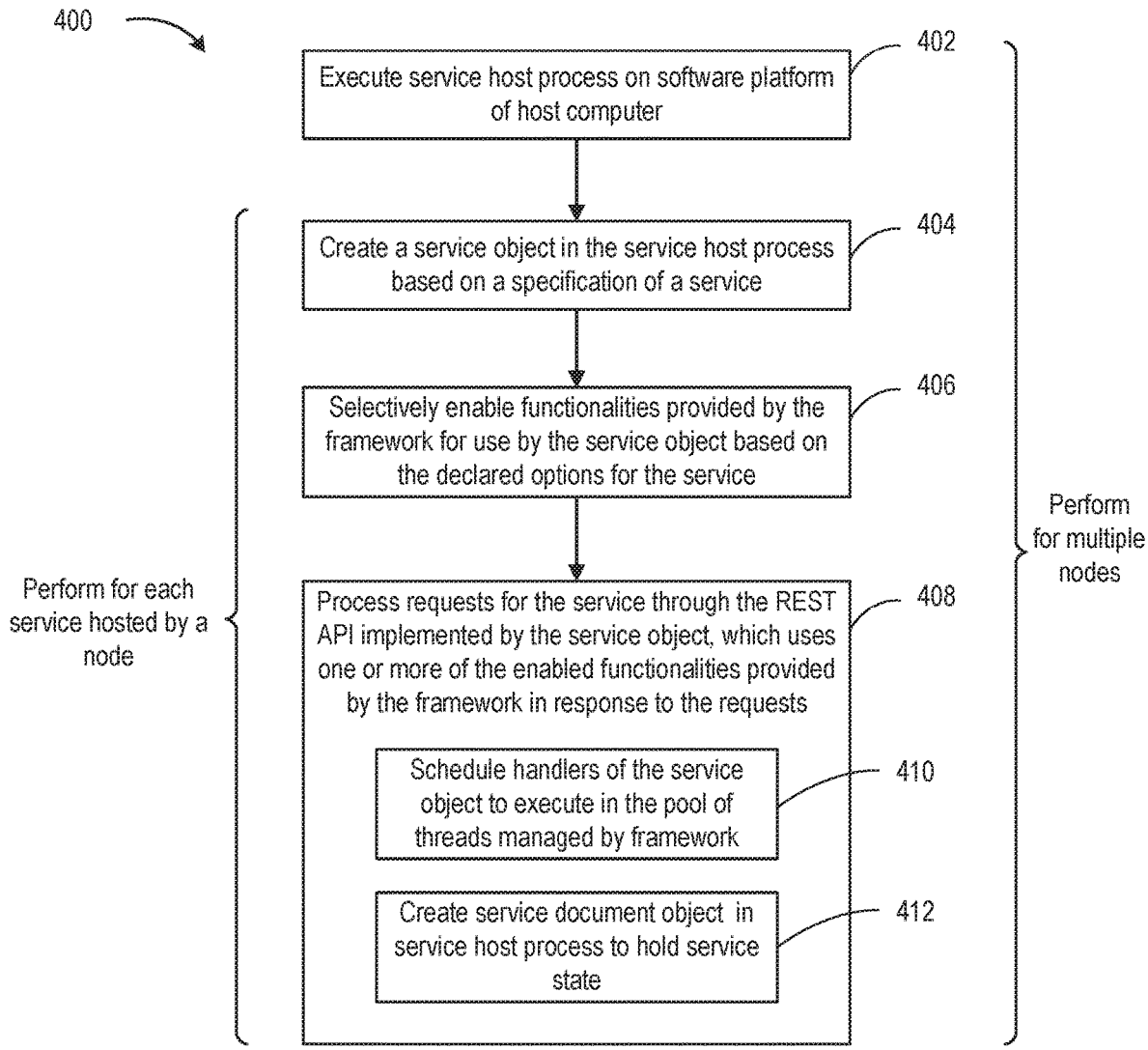
FIG. 4 is a flow diagram depicting a method of implementing a control plane for services in a computer system according to an embodiment.

FIG. 4 is a flow diagram depicting a method 400 of implementing a control plane for services in a computer system according to an embodiment. Method 400 can be used to implement DCP 122 in computer system 100. Method 400 begins at step 402, where an administrator executes a service host process 300 (e.g., node 206) on software platform 103 of a host computer 150. As discussed above, service host process 300 includes framework 212 that provides a plurality of functionalities. Example functionalities include synchronization, replication, persistence, consensus and leader election, and the like.

At step 404, runtime 302 in framework 212 creates a service object 301 in service host process 300 based on a specification of a service (e.g., service specifications 312). Service object 301 includes a REST API. The REST API supports a plurality of verbs (e.g., HTTP PUT, PATCH, GET, DELETE, POST, etc.). Service specifications 312 define declared options for the service. The declared options are used to define the capabilities of the service. For example, a declared option PERSISTENCE makes the service durable; a declared option REPLICATION makes the service a replicated service; a declared option OWNER SELECTION adds consensus and leader election to the replication protocol, etc.

At step 406, runtime 302 selectively enables functionalities for use by service object 301 based on the declared options for the service. At step 408, runtime 302 processes requests for the service through the REST API implemented by service object 301, which uses one or more of the enabled functionalities provided by runtime 302 in response to the requests. Requests can originate from client applications 165, from remote services (services in another node), or from local services (services in this node). Request processing can vary depending on the enabled functionalities. For example, if the REPLICATION option is declared, requests that update service state are replicated across peer nodes. If the PERSISTENCE option is declared, updated state is stored as a new version of state in document store 352. Service object 301 uses enabled functionalities provided by runtime 302 through asynchronous operations. Thus, all service interactions take place through asynchronous message passing.

Step 408 includes a step 410, where runtime 302 schedules handlers 304 for service object 301 to execute in a pool of threads 306 managed by runtime 302. Thus, a single pool of threads is used across all services in the same service host process (node). Service handlers run in any available thread and do not share a call stack with other services. A handler can inherit functionality from runtime 302 (e.g., default handlers in service logic 309). A handler can instead include a functionality specified in the specification for the service (e.g., handlers that override the default handlers in service logic 309). A handler can both inherit functionality from runtime 302 and include custom functionality. Step 408 can include a step 412, where runtime 302 creates a service document object 364 to hold service state for use by handlers 304 of service object 301. Service document object 364 is created based on a specification of a service document (e.g., in service specifications 312).

Steps 404-412 can be performed for each service hosted by the node. Method 400 can be performed for multiple nodes of DCP 122. Multiple nodes can execute on a single host and/or across multiple hosts.

Figure 5:
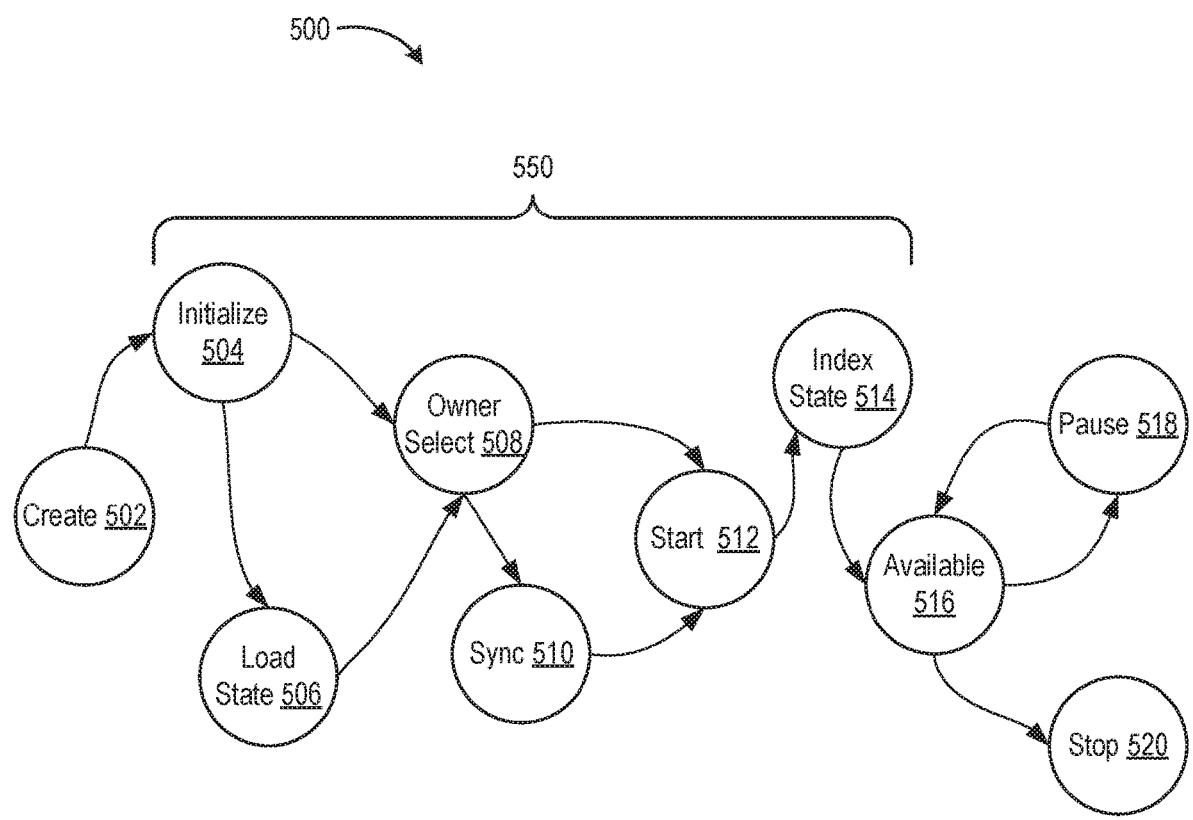
FIG. 5 is a state diagram showing service object lifecycle according to an embodiment.

FIG. 5 is a state diagram showing service object lifecycle 500 according to an embodiment. Services objects 301 transition through a plurality of processing stages of service object lifecycle 500. Service object lifecycle 500 begins at a create stage 502, where a service object is instantiated (e.g., using a service factory object or directly by the service host process) and is attached to the service host process. The service host process maintains a list of all attached service objects. Runtime 302 also generates a request to start the service, which is provided as input to a service start state machine that controls the startup portion 550 of service object lifecycle 500. Startup portion 550 is between create stage 502 and available stage 516.

After creation, service object lifecycle 500 proceeds to initialization stage 504, where runtime 302 initializes an operation object that encapsulates the startup request. For example, runtime 302 can initialize an authorization context for the startup request. Runtime 302 also determines whether the service being started is indexed and, if so, selects a load state stage 506 as the next stage. If the service being started is not indexed, runtime 302 selects an owner selection stage 508 as the next stage.

After initialization, service object lifecycle 500 can transition to load state stage 506 (i.e., if the service is indexed). During the load state stage 506, runtime 302 loads the most recent service document of the service into memory and links it to the startup request. If there is an initial service state provided in the request to create the service, the initial service state is used as the most recent service document.

From either initialization stage 504 or load state stage 506, service object lifecycle 500 transitions to owner selection stage 508. At owner selection stage 508, runtime 302 determines whether the service being started is replicated (i.e., the REPLICATION service option is set). If not, runtime 302 transitions directly to a start stage 512. If the service being started is replicated, runtime 302 assigns a node ID of the owner node for the service to the service object and sets the next stage as a synchronization stage 510.

During synchronization stage 510, the service object synchronizes service state with other service objects for the service on peer nodes. From either owner selection stage 508 or synchronization stage 510, service object lifecycle 500 transitions to start stage 512. At start stage 512, the service object becomes visible to clients, processes any self-requests, and queues external requests. Runtime 302 calls a creation handler, start hander, or both of the service object during start stage 512.

From start stage 512, service object lifecycle 500 transitions to index state stage 514, where runtime 302 requests index service to index and store the service document object linked to the service object. From index state stage 514, service object lifecycle 500 transitions to available stage 516. At available stage 516, the service object de-queues and processes requests.

From available stage 516, service object lifecycle 500 can transition to pause stage 518. In pause stage 518, the service is paused (e.g., runtime 302 can pause a service in response to memory pressure). Service object lifecycle 500 can transition back to available stage 516 from pause stage 518 (e.g., runtime 302 can resume a paused service in response to a request targeting the service). From available stage 516, service object lifecycle 500 can transition to a stop stage 520. At stop stage 520, runtime 302 reclaims resources used by the service object. Runtime 302 calls a stop handler of the service object during stop stage 520 and removes the service object from the attached service list of the service host process.

Decentralized Control Transactions

In an embodiment, the DCP described above supports multi-service transactions. A transaction is a series of operations targeting one or more services that are part of a single context. Transaction handling in the DCP provides for atomicity, where the whole transaction will either succeed or fail, and for isolation, where transactions accessing services concurrently do not interfere with one another. Transaction handling described herein is optimistic, allowing multiple transactions to be in flight in parallel with conflict resolution between transactions.

Referring to FIG. 3, in an embodiment, core service objects 301C in framework 212 include transaction service objects 362. Transaction service objects 362 include a transaction factory service that can create transaction services for transactions being handled by the DCP. Each transaction is identified by a transaction indicator (referred to herein as TXID). For example, the transaction factory can be accessed at /core/transactions and a given transaction service can be accessed at /core/transactions/TXID, where TXID is a particular indicator. Framework 212 can create an instance of a transaction service for each unique transaction being handled by the DCP.

Referring to FIG. 7, to create a transaction, a client generates a TXID. A TXID can be any globally unique identifier. The client tags each request that is to be part of the transaction with the TXID. The TXID can be included in any part of request message 714. Operation object 700 can include a TXID field 726. When runtime 302 creates an operation object 700 for a transaction-based request, runtime 302 populates TXID field 726 with the TXID included in the request. Services provide transaction handling for any operation that includes a populated TXID field 726. Upon receiving a first request with a given TXID, runtime 302 creates a transaction service object to manage the transaction.

Figure 8:
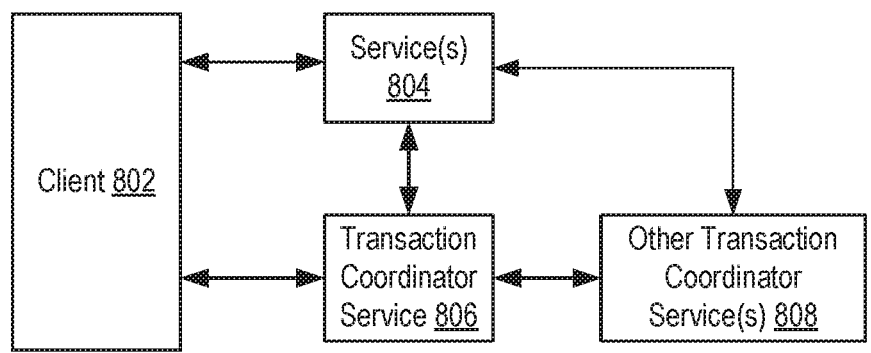
FIG. 8 is a block diagram depicting a logical view of transaction handling in a DCP according to an embodiment.

FIG. 8 is a block diagram depicting a logical view of transaction handling in a DCP according to an embodiment. In the example, the logical view includes a client 802, one or more services 804, a transaction coordinator service 806, and one or more transaction coordinator services 808. Client 802 can be an external client (e.g., client apps 165) or another service in DCP. Each of service(s) 804 is implemented by service objects 301M. Transaction coordinator service 806 manages a given transaction and is an instance of a transaction service object 362. Transaction coordinator service(s) 808 manage other transaction(s) and are also instance(s) of transaction service object(s) 362.

Figure 9:
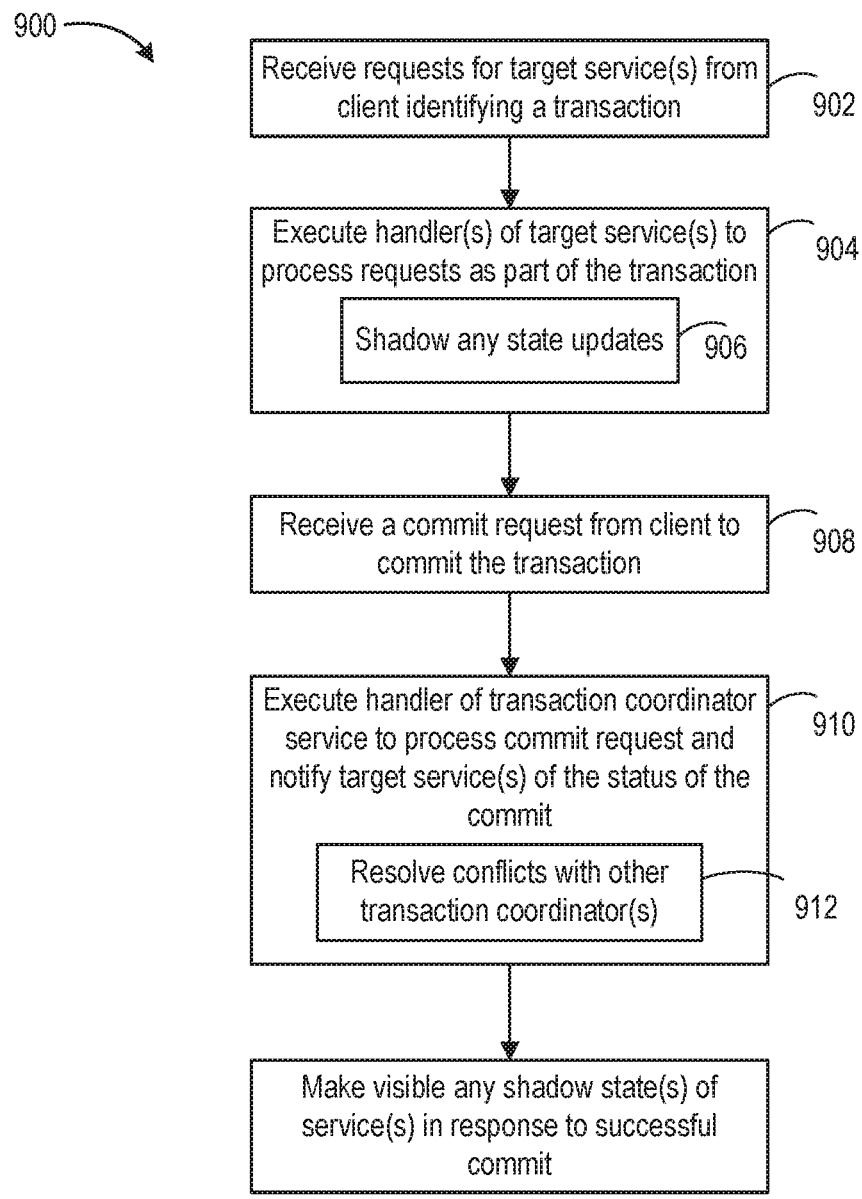
FIG. 9 is a flow diagram depicting a method of handling a transaction in a DCP according to an embodiment.

FIG. 9 is a flow diagram depicting a method 900 of handling a transaction in a DCP according to an embodiment. Method 900 is described with respect to service host process 300 shown in FIG. 3 and the logical view shown in FIG. 8. Method 900 begins at step 902, where runtime 302 receives requests for target service(s) 804 from client 802 identifying a transaction. At step 904, runtime 302 executes handler(s) of service(s) 804 to process the requests as part of the transaction. In particular, for any write request (e.g., PUT, PATCH, etc. request), service(s) 804 shadow state updates (906). For example, during the transaction, each state update for a given service is tagged with the TXID for the transaction. Any version of state that is tagged with a TXID is deemed to be a "shadow state" for the service and is invisible outside of the context of the transaction. A given service can be handling multiple transactions and thus can have multiple different shadow states.

At step 908, runtime 302 receives a commit request from client 802. Client 802 issues the commit request targeting transaction coordinator service 806 to complete and commit the transaction. At step 910, runtime 302 executes a handler of transaction coordinator service 806 to process the commit request and notify service(s) 804 of the status of the commit operation. In particular, transaction coordinator service 806 resolves conflicts with other transaction coordinator service(s) 808 that are managing other transaction(s) in parallel with the transaction managed by transaction coordinator service 806 (912). Embodiments of conflict resolution are described further below. At step 914, service(s) 804 make visible any shadow state(s) in response to a successful commit notification from transaction coordinator service 806. For example, a service can remove the TXID tag from a shadow state to make the state version visible outside of the transaction.

In the embodiment of FIG. 9, it is assumed that the transaction is successfully committed. In embodiments, client 802 can cancel a given transaction by sending a cancellation request targeting transaction coordinator service 806. In such case, transaction coordinator service 806 fails the commit operation and notifies service(s) 804 accordingly. In response, service(s) 804 do not make visible any shadow state(s) resulting from the transaction. Also, even if client 802 issues a commit request, the conflict resolution process of transaction coordinator service 806 can result in a failure to commit the transaction.

Figure 10:
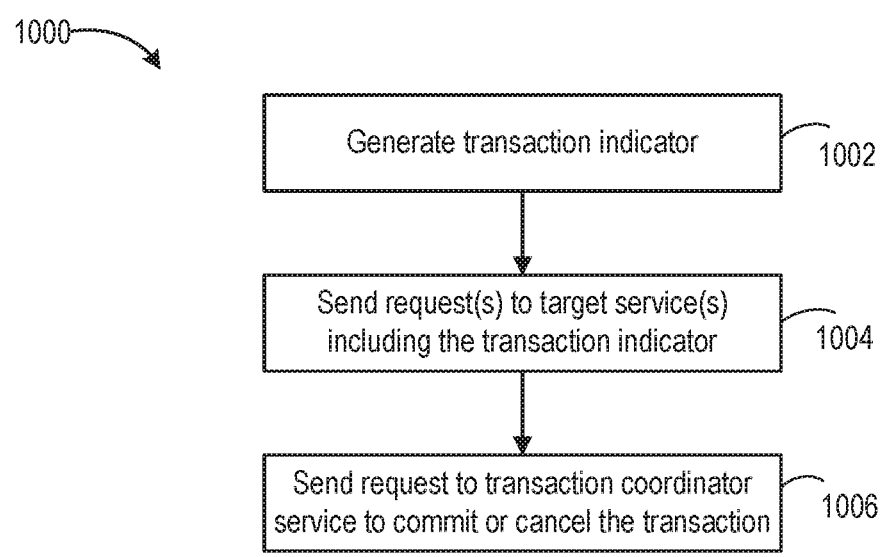
FIG. 10 is a flow diagram depicting a method of handling a transaction at a client according to an embodiment.

FIG. 10 is a flow diagram depicting a method 1000 of handling a transaction at a client according to an embodiment. Method 1000 can be performed by client 802. At step 1002, client 802 generates a transaction indicator (referred to as TXID). The transaction indicator can be any globally unique identifier. At step 1004, client 802 sends one or more requests to target service(s) each of which includes the transaction indicator. Client 802 can send any number of read and/or write requests as part of the transaction. At step 1006, client 802 sends a request targeting transaction coordinator service 806 to commit or cancel the transaction.

Figure 11:
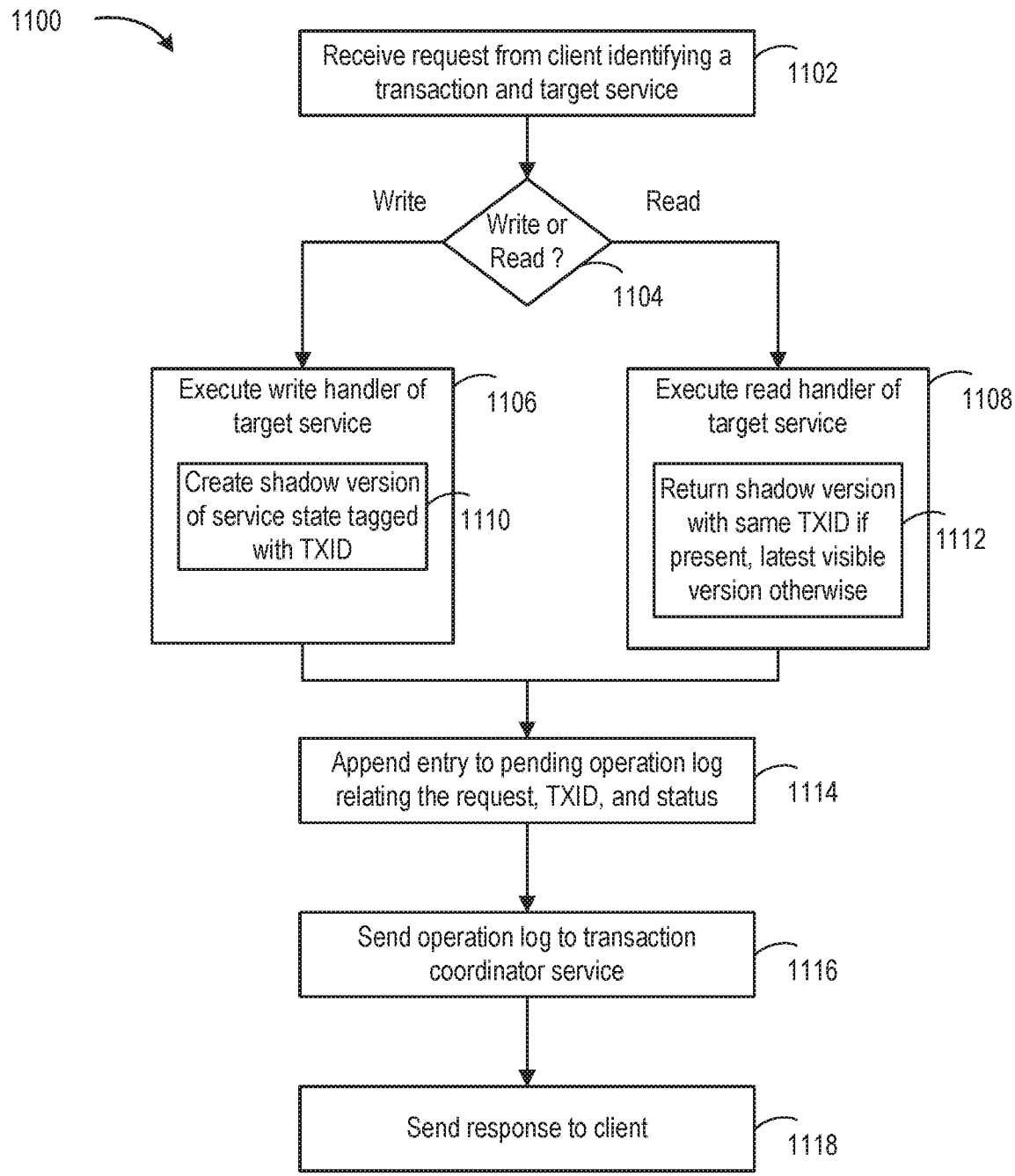
FIG. 11 is a flow diagram depicting a method of handling requests that are part of a transaction at a DCP according to an embodiment.

FIG. 11 is a flow diagram depicting a method 1100 of handling requests that are part of a transaction at a DCP according to an embodiment. Method 1100 can be performed by framework 212. At step 1102, runtime 302 receives a request from client 802 targeting a service 804 and identifying a transaction. At step 1104, runtime 302 determines whether the request is a read request or a write request (e.g., runtime 302 identifies the type of the request). If the request is a write request, method 1100 proceeds to step 1106, where runtime 302 executes a write handler of the target service (e.g., a PUT handler, PATCH handler, etc.). If the request is a read request, method 1100 proceeds to step 1108, where runtime 302 executes a read handler of the target service (e.g., a GET handler).

At step 1106, the write handler of target service 804 creates a shadow version of service state tagged with the TXID of the transaction (1110). At step 1108, the read handler of target service 804 returns a shadow version of service state having the TXID of the transaction if available (1112). Otherwise, the read handler of target service 804 returns the latest visible version of service state.

At step 1114, the executed handler of target service 804 appends an entry to a pending operation log. In an embodiment, the entry relates the request, the TXID, and the status of the request (e.g., success or failure). In this manner, each service 804 maintains a log of pending operations for one or more transactions. At step 1116, the executed handler of target service 804 sends the pending operation log to transaction coordinator service 806. As described further below, transaction coordinator service 806 uses pending operation logs from service(s) 804 during the conflict resolution process when receiving a commit request for a transaction. At step 1118, the executed handler of target service 804 sends a response to client 802 for the request.

Figure 12:
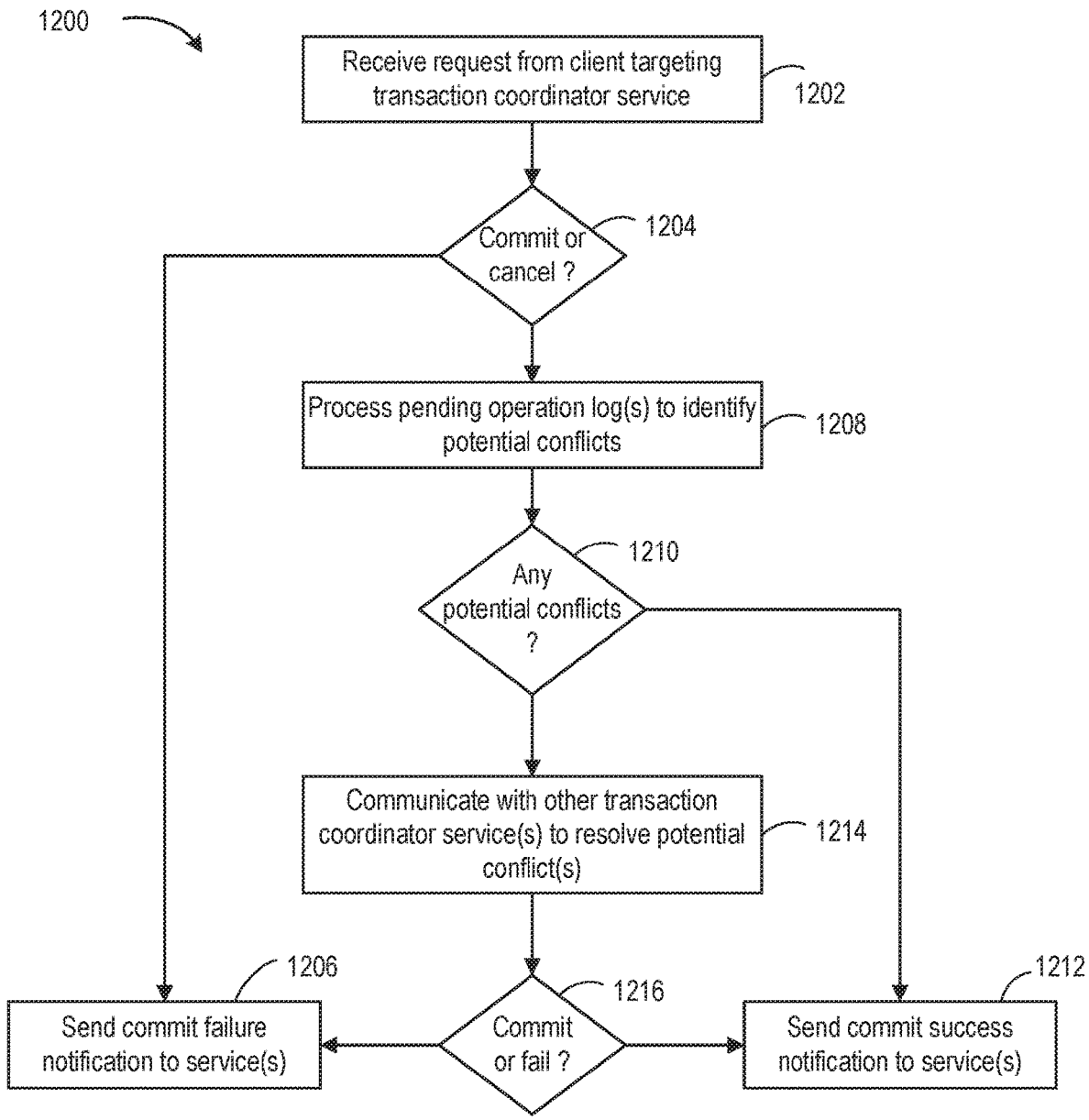
FIG. 12 is a flow diagram depicting a method of handling requests targeting a transaction coordinator service according to an embodiment.

FIG. 12 is a flow diagram depicting a method 1200 of handling requests targeting transaction coordinator service 806 according to an embodiment. Method 1200 can be performed by framework 212. At step 1202, runtime 302 receives a request targeting transaction coordinator service 806 from client 802. The request can be a request to commit the transaction or a request to cancel the transaction. Runtime 302 executes a handler of transaction coordinator service 806 to process the request.

At step 1204, the executed handler of transaction coordinator service 806 determines whether the request is a commit request or cancel request. If the request is a cancel request, method 1200 proceeds to step 1206, where the executed handler of transaction coordinator service 806 notifies each of service(s) 804 of a commit failure. If the request is a commit request, method 1200 proceeds to step 1208, where the executed handler of transaction coordinator service 806 processes the pending operation log(s) received from service(s) 804 to identify any potential conflicts. A potential conflict arises if the operation log of a given service includes operations from more than one transaction.

At step 1210, the executed handler of transaction coordinator service 806 determines whether there are any potential conflicts. If not, method 1200 proceeds to step 1212, where the executed handler of transaction coordinator service 806 notifies each of service(s) 804 of a commit success. If there are potential conflict(s) at step 1210, method 1200 proceeds to step 1214. At step 1214, the executed handler of transaction coordinator service 806 communicates with other transaction coordinator service(s) 808 to resolve the potential conflict(s). Conflict resolution is discussed further below.

At step 1216, the executed handler of transaction coordinator service 806 determines whether the transaction should be committed or failed based on the resolution of the potential conflict(s). If any of the potential conflicts is an actual conflict, the commit is failed. If none of the potential conflicts are actual conflicts, the commit succeeds. If the commit succeeds, method 1200 proceeds to step 1212. If the commit fails, method 1200 proceeds to step 1206.

Figure 13:
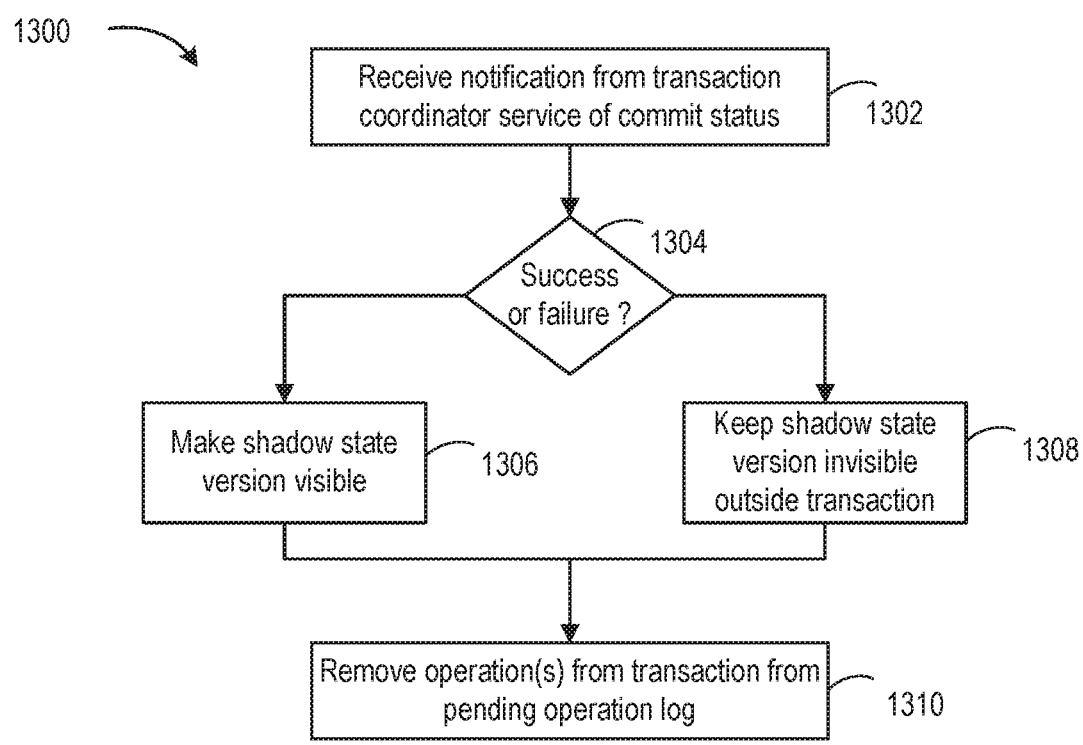
FIG. 13 is a flow diagram depicting a method of handling a transaction commit at a service according to an embodiment.

FIG. 13 is a flow diagram depicting a method 1300 of handling a transaction commit at a service according to an embodiment. Method 1300 begins at step 1302, where service 804 receives a notification from transaction coordinator service 806 of the commit status. Transaction coordinator service 806 can notify service(s) 804 using various mechanisms, such as callbacks, public functions, subscriptions, and the like. At step 1304, service 804 determines whether the commit has succeeded for failed. If the commit has succeeded, method 1300 proceeds to step 1306, where service 804 makes any shadow state visible (e.g., by removing the TXID tag). If the commit has failed, method 1300 proceeds to step 1308, where service 804 leaves any shadow state invisible (e.g., by maintain the TXID tag on the shadow state version). At step 1310, service 804 removes the operation(s) resulting from the transaction from the pending operations log.

In method 1200, transaction coordinator service 806 determines whether there are any potential conflicts in committing the transaction. If each pending operation log includes operations that belong to the same transaction, then there are no potential conflicts. Transaction coordinator service 806 can monitor the pending operation log(s) as they are received from service(s) 804. Once a given log includes operations than belong to different transactions, transaction coordinator service 806 can then flag a potential conflict. Until such time, transaction coordinator service 806 assumes no potential conflicts and can commit the transaction as soon as a commit request arrives from client 802.

If a given pending operation log of a particular service includes operations for multiple transactions, then a potential conflict arises. A transaction depends on another transaction if an operation from one transaction (dependent transaction) has reached a service after a pending operation from another transaction (parent transaction). Transaction coordinator service 806 implements an optimistic concurrency-control criterion as follows: A conflict occurs if a parent transaction commits an update to a service that the dependent transaction reads or writes.

Figure 14:
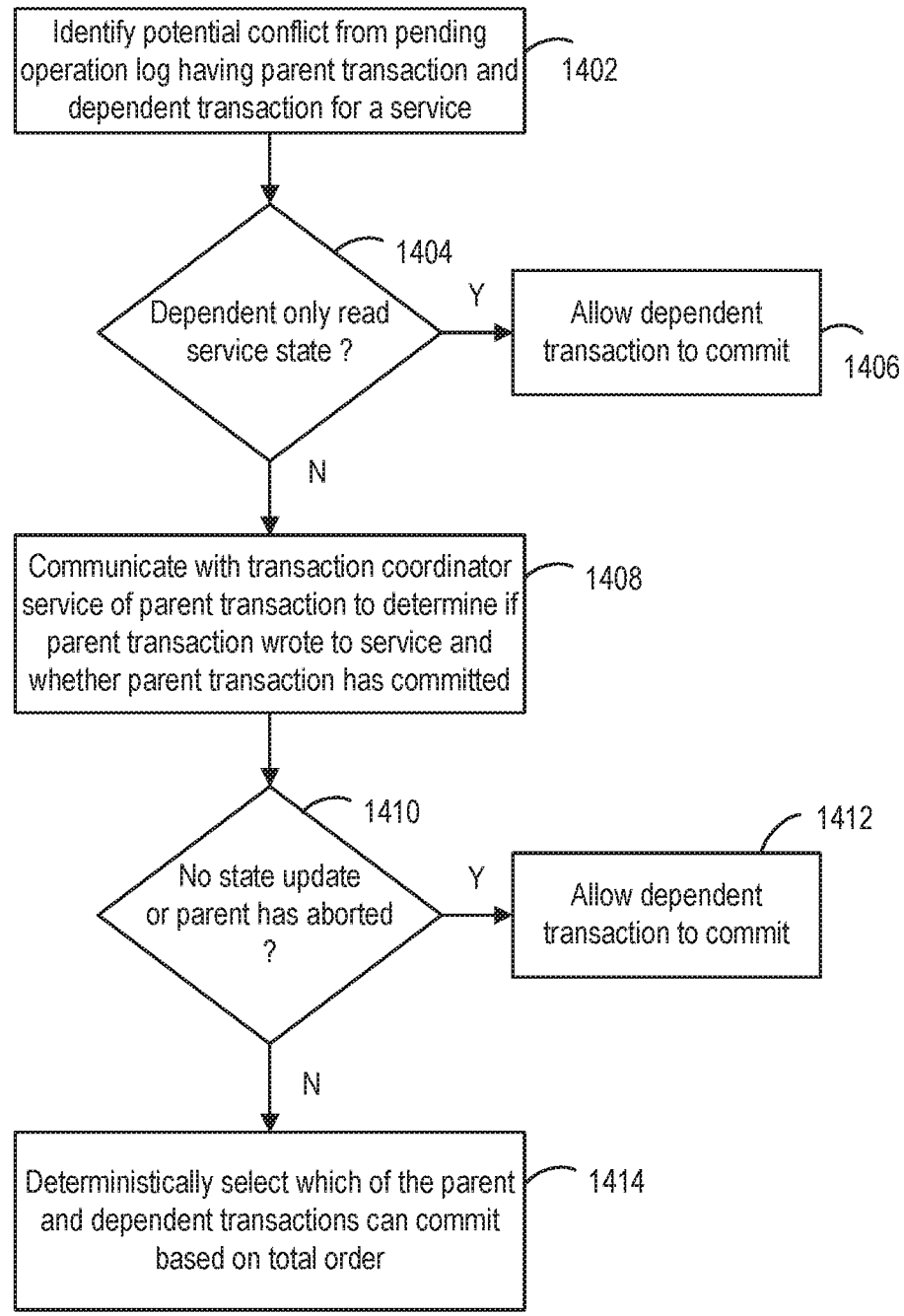
FIG. 14 is a flow diagram depicting a method of conflict resolution in transaction handling according to an embodiment.

FIG. 14 is a flow diagram depicting a method 1400 of conflict resolution in transaction handling according to an embodiment. Method 1400 can be performed by a handler of transaction coordinator service 806. Method 1400 begins at step 1402, where transaction coordinator service 806 identifies a potential conflict from a pending operation log having a parent transaction and a dependent transaction for a given service, where the dependent transaction is managed by the transaction coordinator service 806. At step 1404, transaction coordinator service 806 determines whether the dependent transaction only read the state of the service. If so, method 1400 proceeds to step 1406, where the transaction coordinator service 806 allows the dependent transaction to commit. Otherwise, method 1400 proceeds to step 1408.

At step 1408, the transaction coordinator service 806 communicates with a transaction coordinator service 808 of the parent transaction to determine if the parent transaction updated service state (i.e., wrote to the state of the service) and whether the parent transaction has committed. At step 1410, the transaction coordinator service 806 determines whether the parent transaction updated the state or has aborted (based on the information obtained in step 1408). If the parent transaction did not update the service state or the parent transaction has aborted, method 1400 proceeds to step 1412, where the transaction coordinator service 806 allows the dependent transaction to commit. Otherwise, method 1400 proceeds to step 1414. At step 1414, the transaction coordinator service 806 deterministically selects which of the parent and dependent transactions can commit based on a total order agreed to by the transaction coordinator services 806 and 808. For example, transaction coordinator 806 can be preferred over transaction coordinator 808 if and only if transaction coordinator 806 has a URI path that is lexicographically smaller than the URI path of the transaction coordinator 808. While URI path is described as an example, other metrics can be used to implement a deterministic order among transaction coordinators.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing a transaction in a control plane executing on a computing system that manages a plurality of services, the method comprising:
   receiving, at the control plane from a client, a plurality of first requests for at least one target service of the plurality of services, each of the plurality of first requests including a transaction indicator identifying the transaction as requested by the client;
   executing at least one handler of the at least one target service to perform a plurality of operations associated with the plurality of first requests;
   generating, by the at least one handler, a plurality of logs after performing the plurality of operations in response to receiving the plurality of first requests;
   receiving, at the control plane from the client, a commit request for a transaction coordinator service, the commit request including an instruction to commit the transaction and complete performance of the plurality of operations; and
   executing a handler of the transaction coordinator service to determine whether at least one conflict exists between the transaction and at least one other transaction by comparing the plurality of logs generated from performing the plurality of operations with a plurality of other logs associated with the at least one other transaction and notify the at least one target service of a status of the commit request, wherein executing the handler of the transaction coordinator service comprises:
      receiving the plurality of other logs from at least one other transaction coordinator service associated with the at least one other transaction; and
      when the at least one conflict exists, resolving the at least one conflict between the transaction and the at least one other transaction.

2. The method of claim 1, wherein each of the plurality of logs includes a plurality of entries, each of the plurality of entries relating a particular request of the plurality of first requests, the transaction indicator, and a status of the particular request.

3. The method of claim 1, wherein the plurality of first requests for the at least one target service includes a write request targeting a first target service, and wherein executing the at least one handler comprises:
   processing the write request to create a new shadow version of a state of the first target service, the shadow version invisible outside of the transaction.

4. The method of claim 3, further comprising:
   processing a notification from the transaction coordinator service to reveal the shadow version of the state of the first target service.

5. The method of claim 3, wherein the plurality of first requests includes a read request targeting the first target service, and wherein executing the at least one handler comprises:
   processing the read request to return the shadow version of the state of the first target service.

6. A computer system, comprising:
   a hardware platform having a processor and memory;
   a software platform executing on the hardware platform;
   a service host process executing within the software platform, the service host process including a framework that controls access to a plurality of services, the service host process configured to:
      receive, from a client, a plurality of first requests for at least one target service of the plurality of services, each of the plurality of first requests including a transaction indicator identifying the transaction as requested by the client;
      execute at least one handler of the at least one target service to perform a plurality of operations associated with the plurality of first requests;
      generate, by the at least one handler, a plurality of logs after performing the plurality of operations in response to receiving the plurality of first requests;
      receive, from the client, a commit request for a transaction coordinator service, the commit request including an instruction to commit the transaction and complete performance of the plurality of operations; and
      execute a handler of the transaction coordinator service to determine whether at least one conflict exists between the transaction and at least one other transaction by comparing the plurality of logs generated from performing the plurality of operations with a plurality of other logs associated with the at least one other transaction and notify the at least one target service of a status of the commit request, wherein the service host process is configured to execute the handler of the transaction coordinator service by:
         receiving the plurality of other logs from at least one other transaction coordinator service associated with the at least one other transaction; and
         when the at least one conflict exists, resolving the at least one conflict between the transaction and the at least one other transaction.

7. The computer system of claim 6, wherein each of the plurality of logs includes a plurality of entries, each of the plurality of entries relating a particular request of the plurality of first requests, the transaction indicator, and a status of the particular request.

8. The computer system of claim 6, wherein the plurality of first requests for the at least one target service includes a write request targeting a first target service, and wherein the service host process is configured to execute the at least one handler by:
   processing the write request to create a new shadow version of a state of the first target service, the shadow version invisible outside of the transaction.

9. The computer system of claim 8, wherein the service host process is further configured to:
   process a notification from the transaction coordinator service to reveal the shadow version of the state of the first target service.

10. The computer system of claim 8, wherein the plurality of first requests includes a read request targeting the first target service, and wherein the service host process is configured to execute the at least one handler by:
    processing the read request to return the shadow version of the state of the first target service.

11. A non-transitory computer readable medium comprising instructions, which when executed in a computer system, causes the computer system to carry out a method of managing a transaction in a control plane executing on a computing system that manages a plurality of services, the method comprising:

receiving, at the control plane from a client, a plurality of first requests for at least one target service of the plurality of services, each of the plurality of first requests including a transaction indicator identifying the transaction as requested by the client;

executing at least one handler of the at least one target service to perform a plurality of operations associated with the plurality of first requests;

generating, by the at least one handler, a plurality of logs after performing the plurality of operations in response to receiving the plurality of first requests;

receiving, at the control plane from the client, a commit request for a transaction coordinator service, the commit request including an instruction to commit the transaction and complete performance of the plurality of operations; and executing a handler of the transaction coordinator service to determine whether at least one conflict exists between the transaction and at least one other transaction by comparing the plurality of logs generated from performing the plurality of operations with a plurality of other logs associated with the at least one other transaction and notify the at least one target service of a status of the commit request, wherein executing the handler of the transaction coordinator service comprises:

receiving the plurality of other logs from at least one other transaction coordinator service associated with the at least one other transaction; and when the at least one conflict exists, resolving the at least one conflict between the transaction and the at least one other transaction.

12. The non-transitory computer readable medium of claim 11, wherein each of the plurality of logs includes a plurality of entries, each of the plurality of entries relating a particular request of the plurality of first requests, the transaction indicator, and a status of the particular request.

13. The non-transitory computer readable medium of claim 11, wherein the plurality of first requests for the at least one target service includes a write request targeting a first target service, and wherein executing the at least one handler comprises:

processing the write request to create a new shadow version of a state of the first target service, the shadow version invisible outside of the transaction.

14. The non-transitory computer readable medium of claim 13, the method further comprising:

processing a notification from the transaction coordinator service to reveal the shadow version of the state of the first target service.

15. The method of claim 1, wherein each service in the plurality of services is associated with a unique uniform resource indicator (URI).

\* \* \* \* \*